(12) United States Patent
Hanna et al.

(10) Patent No.: US 9,187,337 B2
(45) Date of Patent: Nov. 17, 2015

(54) METHOD OF INCREASING THE STABILITY OF A BAYER PROCESS LIQUOR

(75) Inventors: Glen Alan Hanna, Kwinana (AU); Mitch Loan, Trigg (AU); Felicia Ai-Nee Lee, St. James (AU)

(73) Assignee: Alcoa of Australia Limited, Booragoon (AU)

( * ) Notice: Subject to any disclaimer, the term of this patent is extended or adjusted under 35 U.S.C. 154(b) by 121 days.

(21) Appl. No.: 13/820,973

(22) PCT Filed: Sep. 5, 2011

(86) PCT No.: PCT/AU2011/001143
§ 371 (c)(1),
(2), (4) Date: Aug. 21, 2013

(87) PCT Pub. No.: WO2012/031316
PCT Pub. Date: Mar. 15, 2012

(65) Prior Publication Data
US 2014/0010742 A1    Jan. 9, 2014

(30) Foreign Application Priority Data

Sep. 6, 2010  (AU) .............................. 2010903987

(51) Int. Cl.
| C01F 7/00 | (2006.01) |
| C01F 7/06 | (2006.01) |
| C01F 7/04 | (2006.01) |
| C01F 7/14 | (2006.01) |
| C01F 7/47 | (2006.01) |

(52) U.S. Cl.
CPC ............... *C01F 7/0666* (2013.01); *C01F 7/046* (2013.01); *C01F 7/144* (2013.01); *C01F 7/47* (2013.01)

(58) Field of Classification Search
None
See application file for complete search history.

(56) References Cited

U.S. PATENT DOCUMENTS

| 3,085,853 | A | * | 4/1963 | Lesinski et al. ............... 423/131 |
| 5,008,089 | A | * | 4/1991 | Moody et al. ............... 423/121 |
| 5,041,269 | A | * | 8/1991 | Moody et al. ............... 423/127 |
| 5,091,159 | A | * | 2/1992 | Connelly et al. ............... 423/122 |
| 5,106,599 | A | | 4/1992 | Roe |
| 5,387,405 | A | | 2/1995 | Connelly et al. |
| 5,716,530 | A | | 2/1998 | Strominger et al. |
| 6,726,845 | B1 | * | 4/2004 | Barham et al. ............... 210/727 |
| 6,740,249 | B1 | * | 5/2004 | Barham ............... 252/1 |
| 7,192,568 | B2 | | 3/2007 | Rosenberg et al. |
| 2009/0130006 | A1 | | 5/2009 | Wang et al. |

FOREIGN PATENT DOCUMENTS

| AU | 199895203 | 7/1999 |
| CA | 825234 | 10/1969 |
| EP | 0465055 B1 | 4/1997 |
| WO | WO99/29626 | 6/1999 |
| WO | 2009/067606 | 5/2009 |
| WO | 2009/085514 | 7/2009 |

OTHER PUBLICATIONS

Roach and Cornell, "Scaling in Bayer Plants", Light Metals, The 13th Australian Chemical Engineering Conference, Paper B7A, Aug. 25-28, 1985, pp. 217-222.
Hellman, et al., "Controlled Enzymatic Synthesis of Dextran", Industrial and Engineering Chemistry, vol. 47, No. 8, Aug. 1955, pp. 1593-1598.
Avotins, et al., "The Effects of Flocculants on Thickener Scaling", 5th International Alumina Quality Workshop, Bunbury, Australia, Mar. 1999, pp. 448-455.
Kildea, et al., "Scale Control and Prevention of Hydrate Precipitation in Red Mud Filters", Light Metals, 2000, pp. 105-110.
Wang, et al., "A Novel Chemistry for Improved Aluminate Scale Control in Bayer Process", Light Metals, 2009.
International Search Report dated Sep. 28, 2011 from corresponding PCT Application No. PCT/AU2011/001143.

* cited by examiner

*Primary Examiner* — Steven Bos
(74) *Attorney, Agent, or Firm* — Greenberg Traurig, LLP

(57) ABSTRACT

Methods, and related products and compositions, of increasing the stability of a Bayer process liquor are described. A method of increasing the stability of a Bayer process liquor includes contacting the Bayer process liquor with a ppm quantity of a low molecular weight dextran. Also described are methods, and related products and compositions, for controlling the precipitation of aluminum-containing compounds from a Bayer process liquor.

16 Claims, 3 Drawing Sheets

| Thickener Overflow/ D-tank Liquor. ||
|---|---|
| Sample | $\Delta A/TC$ after 4 hours at 95°C |
| Blank | 0.048 |
| +1.5 ppm Supplier A- 2,000,000 Daltons | 0.030 |
| +1.5 ppm Supplier B- 2,000,000 Daltons | 0.026 |
| +1.5 ppm Supplier B – 1,000,000 Daltons | 0.013 |
| +1.5 ppm Supplier B – 200,000 Daltons | 0.000 |

Figure 2

METHOD OF INCREASING THE STABILITY OF A BAYER PROCESS LIQUOR

CROSS-REFERENCE TO RELATED APPLICATIONS

This application is a section 371 U.S. National Stage Application of PCT/AU2011/001143, entitled "METHOD OF INCREASING THE STABILITY OF A BAYER PROCESS LIQUOR," filed May 9, 2011 and claiming the priority of Australian Patent Application No. 2010903987, filed Sep. 6, 2010, both of which are incorporated herein in their entirety by reference.

FIELD OF THE INVENTION

The present invention relates to a method of increasing the stability of Bayer liquors to control the precipitation of aluminium-containing compounds therefrom.

BACKGROUND ART

The production of alumina from alumina-containing ores, such as bauxite, is most commonly accomplished using the Bayer process. In this process, the alumina-containing ores are first contacted with recycled caustic aluminate solutions at elevated temperatures, in a process commonly referred to as digestion.

Following digestion, the pressure of the slurry of insoluble red mud in sodium aluminate solution (also known as green liquor) is reduced to atmosphere through a series of pressure-reducing tanks. The insoluble red mud is then separated from the sodium aluminate solution. Coarse material can sometimes be removed in crude cyclones called sand traps, while the bulk of the material is settled in raking thickeners with the addition of flocculants. The red mud is taken as underflow from the thickeners and then typically washed in a counter-current washing circuit to recover soluble caustic and alumina values. The overflow typically still contains a fine suspension of red mud particulates, comprising iron oxides, iron hydroxides, silica and the like, and to remove these compounds from the final alumina product the overflow is often passed through one or more filters.

The clarified overflow solution is cooled in heat exchangers to increase the degree of supersaturation of the dissolved alumina. This enhances the precipitation of aluminum tri-hydroxide (gibbsite), which in the Bayer process is also seeded with aluminium tri-hydroxide. The precipitated aluminium tri-hydroxide is separated from the caustic aluminate solution, with a portion of the aluminium tri-hydroxide being recycled to be used as seed and the remainder recovered as product. The remaining caustic aluminate solution is recycled for further digestion of alumina-containing ore.

For efficient and cost effective precipitation of alumina values, high alumina concentrations relative to total caustic concentration (i.e. A/TC ratios) are essential, resulting in supersaturated liquors. However, the efficiency is reduced when any dissolved alumina precipitates prior to (and during) filtration; this also decreases the time for which the filters, tanks and pipes remain operable, negatively impacting on cost of operation and alumina and soda recovery. Most refineries therefore operate within a preferred range of ratios of alumina concentration to total caustic concentration, above which filtration becomes problematic or alumina losses in digesters, thickeners or washers (or pipe-work feeding vessels) become too excessive, and flow losses or maintenance costs increase.

Dextran, a polysaccharide composed of repeating, branched glucose molecules, has been described previously for use in the Bayer Process. More specifically, dextran is an $\alpha$-D-1,6-glucose-linked glucan with side-chains 1-3 linked to the backbone units of the dextran biopolymer. The degree of branching is approximately 5% and the branches are generally 1-2 glucose units long. Dextran is generally available in a variety of fractions, dependent upon molecular weight. In the pharmaceutical industry, dextran fractions having a mean molecular weight of between 1,000 to 2 million Daltons are common.

Canadian Patent 825234 describes the use of dextran or dextran sulfate as a flocculant and a filter aid for the extraction of alumina trihydrate from caustic liquor. It is also said that dextran or dextran sulfate "having as high a molecular weight as possible" is preferred. It is also said that "dextran or dextran sulfate having a molecular weight below about ½ million is not an effective alumina trihydrate flocculant, nor is it an effective filter aid".

U.S. Pat. No. 5,091,159 describes a process in which a water soluble dextran having a molecular weight of at least 50,000, and preferably in the range of 500,000 to 10 million, is added to the overflow of the thickener(s) prior to being passed to a Kelly Filter Press. The doses described are in the range of 0.05 to 15 mg/l. The addition of dextran is said to increase filtration rates in Kelly Pressure Filters, which in turn leads to increased alumina production. Interestingly, the dextran in this process is said to be used in addition to traditional 'lime-type' filter aid.

In U.S. Pat. No. 5,387,405 there is described an "improvement in Bayer liquor polishing", in which thickener overflow has both a bio-carbohydrate polymer, such as dextran, and a filter aid added thereto prior to filtration. The dextran has a molecular weight of at least 10,000, and preferably at least 50,000, and most preferably at least 1 million. It is added at levels of at least 0.1 mg/l. The filter aid may be slaked lime, calcium oxide and the like. The weight ratio of dextran to filter aid is said to be about 1:25 to about 1:2500.

U.S. Pat. No. 5,716,530 describes the use of between 0.05 to 15 mg/l of a water soluble polysaccharide or "biopolymer", added to thickener overflow prior to filtration using specifically sand filters for improved solids removal efficiency. The biopolymer is said to preferably be a microbially produced polysaccharide that may be a "dextran derivative" or a "dextran sulphate". The biopolymer utilised is said to have a molecular weight of "at least 50,000 although values in the range 500,000 to 10 million is preferred".

U.S. Pat. No. 6,740,249 describes the use of a treating agent for a Bayer process liquor, the treating agent comprising a blend of starch and another polysaccharide. The polysaccharide may be dextran or a number of other compounds. The polysaccharide may be present at levels of up to 10 ppm, but preferably 5 ppm. The polysaccharide to starch ratio is said to be preferably between 9:1 and 1:9. The starch is used to decrease the amount of polysaccharide used, and thereby decrease the cost of the process.

U.S. Pat. No. 7,192,568 describes a process for the production of tricalcium aluminate (TCA) filter aid in which slaked lime is dosed with a "surface active agent", the surface active agent possibly being a sugar or polysaccharide, amongst other things. Little detail is provided regarding the specific nature of the surface active agent other than in respect of a sodium gluconate example, in which sodium gluconate was delivered to the slaking tank as a 400 g/l aqueous solution at a dose rate such that a concentration of 390 mg/l was provided in the slaker(s) or 110 mg/l in the lime aging facility.

Beyond use as a filtration aid, dextran has also been described for use in thickeners (also referred to as settlers) and washers for improving flocculation by reducing overflow solids concentration, increasing settling rate and under flow solids density. U.S. Pat. No. 5,008,089 describes the application of dextran and synthetic anionic polymer to thickeners and washers via separate addition, preferably with dextran prior to the synthetic anionic polymer. U.S. Pat. No. 6,726,845 describes using dextran in combination with starch and a water soluble synthetic flocculent, preferably with dextran added separately and post a blend of starch and the synthetic polymer. Both these documents claim a variety of molecular weight ranges, but where >500,000 Daltons is clearly preferable.

A subset of these previously described applications (U.S. Pat. No. 5,008,089, U.S. Pat. No. 6,726,845) is the description of dextran addition to thickener and washer feeds as being beneficial in reducing settled scale formation. Settled scale formation is described as requiring the presence of mud particles by Roach and Cornell (Roach and Cornell, Scaling in Bayer Plants, Light Metals, 1985, TMS) and the cementation of gibbsite precipitation to create the scale. Australian Patent 199895203 describes the use of dextran in Bayer feed process liquor to reduce scaling rates in thickeners and washers. The author's state that the scale reduction is not due to increased liquor stability, "dextran is not acting to stabilise the liquor", as no loss of alumina from liquor was measured. Rather, the authors attribute the reduction in scale growth to a reduction in the amount of gibbsite particles in the over flow and the dextran acting to destabilise the activity of the overflow mud particles via adsorption on its surface. It is likely that the reduction in scaling rates has more to do with improvement in flocculation processes described previously (U.S. Pat. No. 5,008,089, U.S. Pat. No. 6,726,845 B1) and a reduction in overflow solids concentration as reported by Avotins et al (Avotins et al, The Effect of Flocculants on Thickener Scaling, Fifth International Alumina Quality Workshop, Bunbury 21-26 Mar. 1999, 448-455). The dextran used is described as "suitably a high molecular weight dextran having a molecular weight in excess of 500,000" Daltons, but low density dextran having molecular weights from 60,000 to 90,000 or 150,000 to 200,000 can also be used.

Whilst dextran was first discussed as a filtration aid, it has recently been described as a "scale control filtration aid" (Kildea et al, "Scale Control and Prevention of Hydrate Precipitation in Red Mud Filters", Light Metals, 2000, page 105-110) for usage in filtration to improve liquor stability. Polysaccharides and polyols (Wang et al, "A Novel Chemistry for improved Aluminate Scale Control In Bayer Process", Light Metals 2009) have been described as improving liquor stability and for use in reducing autoprecipitation (see for example specifications WO/2009/085514, WO/2009/067606, WO/2009/067606 A3 and US 2009/0130006 A1), autoprecipitation being described as the loss of alumina from thickener overflow liquors in the previously referred to literature. However, the term is used more broadly in the Bayer industry to refer to any loss of aluminium containing compounds from liquor.

WO/2009/085514 in particular describes the perceived disadvantages of the use of dextran as an auto-precipitation inhibitor in Bayer process liquor whilst disclosing the use of one of gum Arabic, tamarind gum, gum ghatti or mixtures thereof at doses of as high as 200 ppm.

WO/2009/067606 A3 and US 2009/0130006 A1 patents and Wang et al (Wang et al, "A Novel Chemistry for improved Aluminate Scale Control In Bayer Process", Light Metals 2009) demonstrated the improved performance of polyols (variant in monomeric origin, molecular weight and structure) when compared to dextran (no molecular weight range given), but of note also claim that dextran can be used as a monomeric unit to generate such liquor stabilizers.

Nalco Australia Pty Ltd has described the use of their dextran product Nalco 85711™ as a scale control filtration aid (Kildea et al, "Scale Control and Prevention of Hydrate Precipitation in Red Mud Filters", Light Metals, 2000, 105-110), and although the authors give no indication of molecular weight range, the same product is described in U.S. Pat. No. 6,726,845 as having a molecular weight greater than 500,000 Daltons.

It is generally understood that inhibition of crystallization (and precipitation) processes by polymers is molecular weight dependent, and that the optimum molecular weight for this inhibition varies depending on the polymer and the crystallising/precipitating solid. The impact of molecular weight on liquor stability has been described for polyols (WO/2009/067606 A3 and US 2009/0130006 A1), but not for dextran by Kildea et al (Kildea et al, "Scale Control and Prevention of Hydrate Precipitation in Red Mud Filters", Light Metals, 2000, 105-110) even though applications for dextran settled scale reduction, as a filtration aid and to improve flocculation, detail molecular weight ranges; that said, for dextrans, these applications specify greater than 500,000 Daltons as being preferable. Dextran in its "native form" has a molecular weight of approximately 2,000,000 Daltons, but can be produced in different molecular weight fractions by membrane filtration or through alternate enzyme production processes (Hellman N N, Tsuchiya H M, Rogovin S P, Lamberts B L, Tobin R, Glass C A, Stringer C S, Jackson R W, and F R Senti, (1954). "Controlled Enzymatic Synthesis of Dextran". *Industrial and Engineering Chemistry.* 47 (8), pp 1593-1598).

U.S. Pat. No. 5,106,599 describes the use of a linear polysaccharide, such as dextran, as an additive, prior to or simultaneously with the addition of seed crystals, to improve the production of alumina trihydrate precipitates from pregnant Bayer process liquors, such as by increasing crystal size. Molecular weights of up to about 40,000,000 for the linear polysaccharide are described as preferable, as are does rates of up to about 1000 ppm.

For the purposes of this discussion we consider low molecular weight dextran to be less than or equal to about 500,000 Daltons and dextran without specific molecular weight definition to refer to its native form having a molecular weight of about 2,000,000 Daltons.

The preceding discussion of the background to the invention is intended to facilitate an understanding of the present invention. However, it should be appreciated that the discussion is not an acknowledgement or admission that any of the material referred to was part of the common general knowledge in Australia or any other country as at the priority date.

DISCLOSURE OF THE INVENTION

Those skilled in the art will appreciate that the invention described herein is susceptible to variations and modifications other than those specifically described.

It is to be understood that the invention includes all such variations and modifications. The invention also includes all of the steps, features, compositions and compounds referred to or indicated in the specification, individually or collectively, and any and all combinations or any two or more of the steps or features.

The present invention is not to be limited in scope by the specific embodiments described herein. These are intended for the purpose of exemplification only.

Functionally equivalent products, compositions and methods are clearly within the scope of the invention.

The entire disclosures of all publications (including patents, patent applications, journal articles, laboratory manuals, books, or other documents) cited herein are hereby incorporated by reference.

Throughout the specification, unless the context requires otherwise, the word "comprise" or variations such as "comprises" or "comprising", will be understood to imply the inclusion of a stated integer or group of integers but not the exclusion of any other integer or group of integers.

In accordance with the present invention there is provided a method of increasing the stability of a Bayer process liquor by controlling the precipitation of aluminium-containing compounds therefrom, the method comprising at least the contacting of the Bayer process liquor with a ppm quantity of a low molecular weight dextran to suppress or reduce precipitation of aluminium-containing compounds from the Bayer process liquor prior to and/or during filtration of the Bayer process liquor, wherein the ppm quantity of the low molecular weight dextran is less than about 15 ppm of active dextran and the dextran has a molecular weight less than about 500,000 Daltons.

The terms "increasing the stability of a Bayer process liquor" or "increasing liquor stability" or "to stabilise liquor" or "stabilising liquor" are to be understood to refer to decreasing the propensity for gibbsite or other aluminium-containing compounds to precipitate from a Bayer process solution within a specified time frame specific to the process. This may mean the complete or near-complete suppression of gibbsite precipitation (or that of other aluminium-containing compounds), or reduced precipitation of gibbsite or of other aluminium-containing compounds (i.e. a reduction in rate of precipitation), during and depending on the holding time of a tank or pipe or process within the refinery.

Advantageously, the method of the present invention permits both the suppression of nucleation and growth.

The quantity of the low molecular weight dextran may be sufficient to suppress precipitation of aluminium-containing compounds prior to and/or during filtration of the Bayer process liquor.

The term "low-molecular weight dextran" is to be understood to refer generally to dextran having a molecular weight less than about 500,000 Daltons, preferably less than 200,000. In one form of the present invention the dextran has a molecular weight between about 1,000 to 200,000 Daltons, in another form a molecular weight between about 10,000 to 200,000 Daltons, and in a still further form a molecular weight between about 100,000 to 200,000 Daltons.

In accordance with the present invention there is still further provided a method for controlling the precipitation of aluminium-containing compounds from a Bayer process liquor, the method comprising the steps of:
  contacting the Bayer process liquor with a ppm quantity of a low molecular weight dextran;
  filtering the Bayer process liquor; and
  precipitating the aluminium-containing compounds.

As such, the low molecular weight dextran may be added in ppm quantities sufficient to suppress precipitation of the aluminium-containing compounds upstream of and through the liquor filtration step, while allowing for the controlled precipitation of the aluminium-containing compounds at a further step downstream of the filtration step.

The step of contacting the Bayer process liquor with a ppm quantity of a low molecular weight dextran may be done for a time period sufficient to increase the stability of the Bayer process liquor. As such, the Bayer process liquor may be contacted with the low molecular weight dextran for a period of between 0.01 and 24 hours. It will be appreciated that the period may be affected by the location in the Bayer circuit at which the low molecular weight dextran is added.

The method may comprise the step of adding more than one quantity of low molecular weight dextran or dextrans to the Bayer Process liquor.

A person skilled in the art of the invention will understand that the amount of low molecular weight dextran added will depend on the subsisting liquor stability of the liquor or slurry being treated. Hence, the amount of low molecular weight dextran added will differ in each application, but may be readily ascertained by a person of ordinary skill in the art having reference to the parameters of the present invention.

Where reference is made to ppm amounts of addition in this specification, this is to be understood to refer to amounts of less than about 15 ppm of active dextran (as opposed to a product that may contain a proportion of active dextran). In one form of the invention, the amount of low molecular weight dextran added is between about 0.15 ppm and 15 ppm. In an alternate form of the invention, the amount of low molecular weight dextran added is between about 0.15 ppm and 7.5 ppm. In an alternate form of the invention, the amount of low molecular weight dextran added is between about 0.15 ppm and 3 ppm. In an alternate form of the invention, the amount of low molecular weight dextran added is between about 0.15 ppm and 1.5 ppm.

The low molecular weight dextran may be added to any feed liquor, or at any Bayer process stage between blow-off and through filtration. Accordingly, the low molecular weight dextran may be added at any point in a clarification circuit such as thickener overflow liquor, surge tanks, or D-tank liquor, thereby to increase the liquor stability prior to filtration.

A "D-tank" is to be understood as a tank or container wherein the overflow liquor from the thickener is held for a short residence time, typically 0.5 hr to 2 hr, prior to filtration.

Alternatively, or additionally, the low molecular weight dextran may be added at any stage from lake water to first washer overflow, washer underflow, washer feed or any flow entering or exiting the clarification circuit, thereby to increase liquor stability. However, those skilled in the art will recognise the choice of addition points and dose relates to the propensity (kinetics) of gibbsite precipitation.

The low molecular weight dextran may be added at the abovementioned doses to thickener or washer flows which includes slurries, liquors, pipes, feed wells, and the like. Accordingly, the low molecular weight dextran can be added at any one or more of a number of process steps, including prior to, or in, a blow off tank, thickener or washer feed or feed wells, a thickener or washer flow (overflow, underflow, secondary dilution, flocculant/chemical lines), in one or more D-tanks, filter feed, and/or in any one or more supplementary flows, which may feed filtration.

In one form of the invention, the step of contacting the liquor with a ppm quantity of low molecular weight dextran occurs prior to the step of separating the suspension, typically including red mud, from the slurry. In such cases, the low molecular weight dextran may be added to blow-off, thickener feed, or feed well streams.

In another form of the invention, the step of contacting the liquor with a ppm quantity of low molecular weight dextran occurs during the washing stages of the Bayer process.

The low molecular weight dextran may be added to liquors having typical Bayer liquor filtration and/or thickening or washing temperatures. As such, the low molecular weight dextran may be added to liquor which is at a temperature of about 50° C. and upwards, typically about 80-110° C., but it will be appreciated that the low molecular weight dextran can be added to liquors which are present in a wide range of temperatures found within a typical Bayer process circuit.

Further aspects of the invention will now be described by way of non-limiting example only, with reference to the following examples and drawings.

BRIEF DESCRIPTION OF THE DRAWINGS

The present invention will now be described, by way of example only, with reference to two embodiments thereof, and the accompanying drawings, in which:

FIG. 2 is a table indicating the effects of different molecular weight dextrans on liquor stability, defined as ΔA/TC after 4 hours for Thickener overflow/D-tank liquor;

BEST MODE(S) FOR CARRYING OUT THE INVENTION

This invention relates to a method of increasing the stability of Bayer process liquors by the addition of ppm values of low molecular weight dextran at one or more loci in the Bayer process, to increase the stability of the liquor(s), thereby to keep the aluminium compounds (such as, in certain cases, gibbsite) from precipitating (i.e. to remain, at least partly, in solution) at undesired process stages or loci and to control the process stage or locus in which precipitation of alumina occurs.

The method in accordance with one embodiment of the invention is employed in a Bayer process that utilises any form of filtration to rid the liquor (containing dissolved alumina values) of unwanted impurities. A quantity of low molecular weight dextran is added to a process flow liquor present between the thickener overflow and the filtration stage, preferably into the D-tanks as discussed hereinafter. The addition and concentration (which is usually about 15 ppm or less, with addition of the low molecular weight dextran usually being in the range of about 0.15 to 3 ppm, preferably about 0.15 to 1.5 ppm) depends on a range of factors, not least of which is the desired increase in liquor stability.

Figure 1:
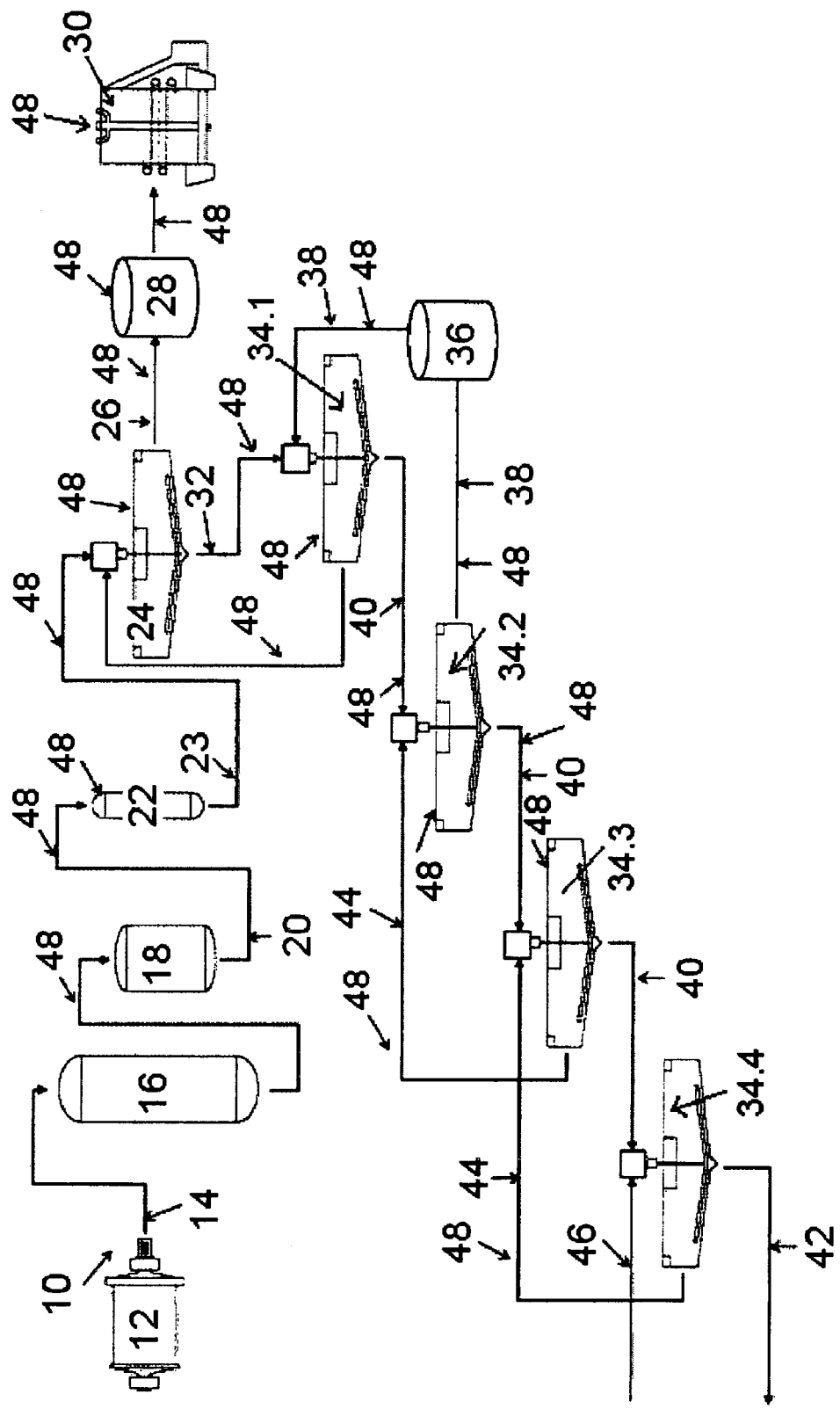
FIG. 1 is a schematic flow sheet showing how a method in accordance with the present invention may be utilised in a Bayer Process circuit.

FIG. 1 shows a simplified representation of a Bayer circuit, indicated generally by reference numeral 10. In FIG. 1, mills 12 provide crushed bauxite 14, which progresses through a de-silication step in reactor 16, followed by heated caustic digestion in digestion tank 18. The resultant slurry 20 is cooled by passing it through a blow off tank 22, following which the cooled slurry 23 is fed into a thickener 24 where flocculent is added to settle and separate solids. The resultant clarified overflow liquor 26 passes to a D-tank 28, from where the liquor is passed through a filtration unit 30. Not shown in FIG. 1 is that in some flow sheets the 1$^{st}$ washer overflow can bypass thickeners directly to the D-tanks.

Underflow 32 from the thickener 24 may still contain useful aluminium values, and is passed through a series of washers 34.1, 34.2, 34.3, 34.4. The first washer 34.1 is fed additionally by a causticizer 36 through which overflow 38 from the second washer 34.2 is passed (the position of the causticizer 36 in the washer circuit may change from refinery to refinery). The underflow 40 from each washer is fed to each subsequent washer (34.1 to 34.4) for further washing. The underflow 42 from the final washer 34.4 is fed to a super thickener (not shown) prior to disposal via the residue area and lakes (not shown). There may, in certain embodiments, be more than the indicated number of washers, depending on operational requirements and bauxite quality. Overflow 44 from each washer is fed back to previous washers 34, while the final wash step has an additional feed of wash water 46 from lakes.

In this process 10, low molecular weight dextran can be added, in accordance with the present invention, at any one or more of a number of process steps, such as prior to, or in, the digester 18, the blow off tank 22, slurry 20, feed 23, the thickener overflow 26, thickener feed well (not shown), thickener underflow 32, in the D-tank(s) 28, or in any washer 34 or other feeds 40, 44 (underflow or overflow) or through the filtration unit 30. The addition of the low molecular weight dextran is shown schematically using reference numeral 48, and may also be added in supplementary flows such as secondary dilution and process chemical additions.

The following non-limiting examples, each comprising several experiments, are intended to assist in the understanding of the reaction parameters of the present invention.

EXAMPLE 1

FIG. 2 provides a table showing the clear difference between high (>500,000 Daltons), and low (<500,000 Daltons) molecular weight dextran from two different production sources for liquor stability application to thickener overflow or D-Tank liquor. The lower molecular weight dextran is an improved liquor stabiliser in comparison to existing higher molecular weight products which have been disclosed (Kildea et al, "Scale Control and Prevention of Hydrate Precipitation in Red Mud Filters", Light Metals, 2000, 105-110).

EXAMPLE 2

Figure 3:
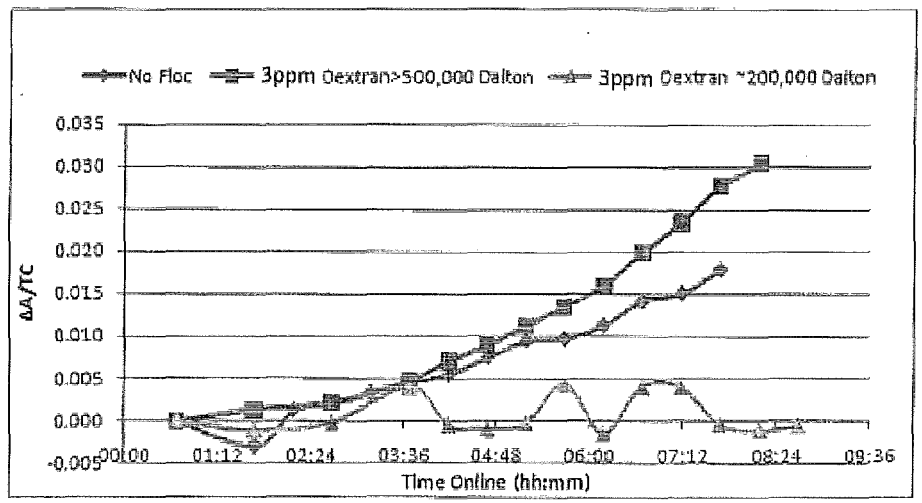
FIG. 3 is a plot indicating change in A/TC produced by different molecular weight dextrans with gibbsite seed over time to demonstrate the difference between nucleation and growth with molecular weight.

FIG. 3 shows the difference between high (>500,000 Daltons), and low (<500,000 Daltons) molecular weight dextran with gibbsite present at 0.8 gpl to demonstrate the differentiation between nucleation and growth of gibbsite in pregnant (also known as supersaturated or green) liquor which would apply to any liquors from blow off to post filtration. Those skilled in the art will know that the degree of supersaturation and therefore rate of nucleation and growth of gibbsite will vary throughout the Bayer process based on liquor concentrations and temperature. In this example the low molecular weight dextran not only prevents nucleation, but also growth unlike the higher molecular weight dextrans (as shown in FIG. 2).

EXAMPLE 3

Figure 4:
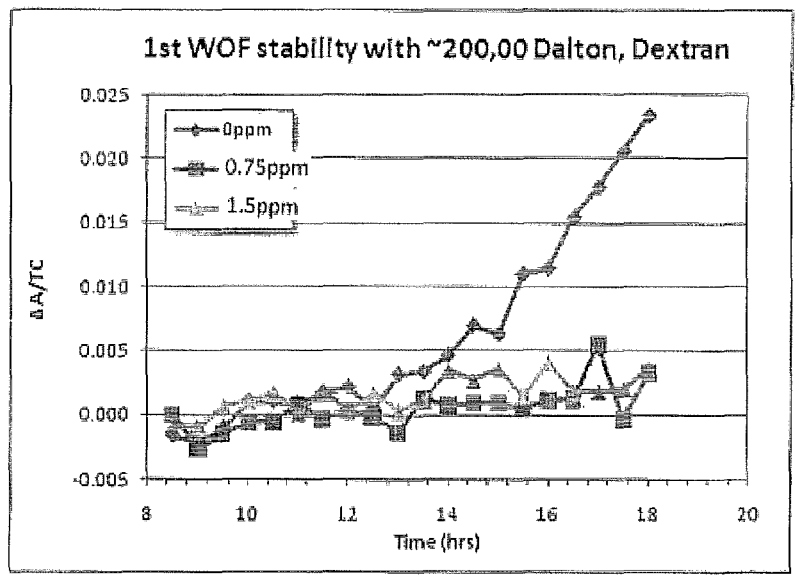
FIG. 4 is a plot indicating change in A/TC produced by different doses of low molecular weight dextran for washer applications.

FIG. 4 shows the dose effectiveness of low molecular weight dextran in stabilising liquor for washer applications where liquors are more dilute and at lower temperatures than upstream applications like blow off, thickeners, D-tanks and filters. It is clearly demonstrated that washer overflow (WOF) to which 0.75 ppm dextran of less than 500,000 Daltons is added is more stable than WOF without dextran. Whilst with 1.5 ppm of the same dextran added the WOF is still more stable.

RESULTS AND DISCUSSION

The results show clear difference between molecular weight and impact on nucleation and growth. This demonstrates the opportunity of such lower molecular weight dextrans to specifically improve liquor stability and therefore reduce precipitation of aluminium containing compounds in or on thickeners, washers, filters, filter medium and process pipes.

The inventors have, after much experimentation, developed a method of significantly increasing the stability of Bayer process liquors to avoid premature and unwanted (i.e. before the filtration step) precipitation of alumina in tanks, pipes and the like, or within residue, by optimization of the appropriate molecular weight of dextran to inhibit nucleation and growth processes which result in loss of alumina from liquor.

Unlike the stabilisation of Bayer liquors using calcia, dextran has the added benefit of being provided in liquid form, which generally equates to low capital and simple application. There are also reduced product impurity (i.e. CaO in product) or liquor impurity (i.e. carbonate or chloride) yield impacts.

Modifications and variations such as would be apparent to the skilled addressee are considered to fall within the scope of the present invention.

What is claimed is:

1. A method of increasing the stability of a Bayer process liquor by controlling the precipitation of aluminum-containing compounds therefrom, the method comprising: contacting the Bayer process liquor with a ppm quantity of a low molecular weight dextran to suppress or reduce precipitation of aluminum-containing compounds from the Bayer process liquor prior to and/or during filtration of the Bayer process liquor, wherein the ppm quantity of the low molecular weight dextran is less than about 15 ppm of active dextran and the dextran has a molecular weight less than about 500,000 Daltons; wherein the low molecular weight dextran is added to thickener overflow liquor, surge tanks, or D-tank liquor, thereby to increase the liquor stability prior to filtration.

2. A method according to claim 1, wherein the dextran has a molecular weight less than about 200,000 Daltons.

3. A method according to claim 1, wherein the dextran has a molecular weight between about 1,000 to 200,000 Daltons.

4. A method according to claim 1, wherein the dextran has a molecular weight between about 10,000 to 200,000 Daltons.

5. A method according to claim 1, wherein the dextran has a molecular weight between about 100,000 to 200,000 Daltons.

6. A method according to claim 1, wherein the method further comprises: filtering the Bayer process liquor; and precipitating the aluminum-containing compounds.

7. A method according to claim 6, wherein the low molecular weight dextran is added in ppm quantities sufficient to suppress precipitation of the aluminum-containing compounds upstream of and through the liquor filtration step, while allowing for the controlled precipitation of the aluminum-containing compounds at a further step downstream of the filtration step.

8. A method according to claim 1, wherein the contacting the Bayer process liquor with a ppm quantity of a low molecular weight dextran is conducted for a time period sufficient to increase the stability of the Bayer process liquor.

9. A method according to claim 8, wherein the Bayer process liquor is contacted with the low molecular weight dextran for a period of between about 0.01 and 24 hours.

10. A method according to claim 1, wherein the method further comprises adding more than one quantity of low molecular weight dextran or dextrans to the Bayer Process liquor.

11. A method according to claim 1, wherein the amount of low molecular weight dextran added is between about 0.15 ppm and 15 ppm.

12. A method according to claim 1, wherein the amount of low molecular weight dextran added is between about 0.15 ppm and 7.5 ppm.

13. A method according to claim 1, wherein the amount of low molecular weight dextran added is between about 0.15 ppm and 3 ppm.

14. A method according to claim 1, wherein the amount of low molecular weight dextran added is between about 0.15 ppm and 1.5 ppm.

15. A method according to claim 1, wherein the low molecular weight dextran is added to liquor which is at a temperature of about 50° C. and above.

16. A method according to claim 15, wherein the temperature of the liquor is about 80-110° C.

* * * * *